No. 741,806. PATENTED OCT. 20, 1903.
W. C. MATTESON.
LOCK WASHER.
APPLICATION FILED AUG. 4, 1903.
NO MODEL.
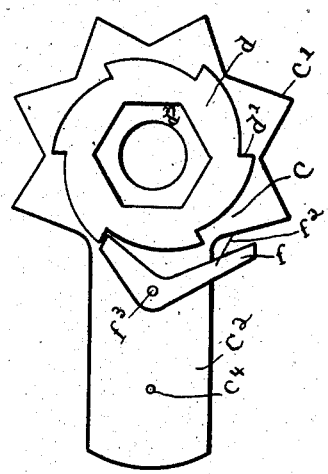
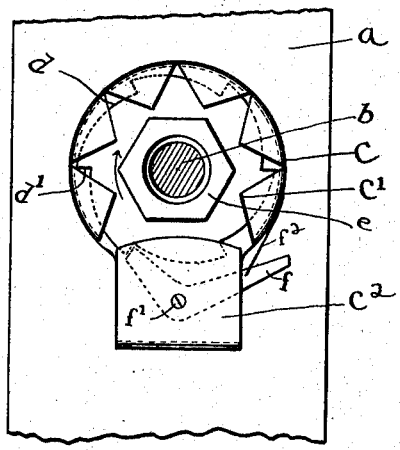 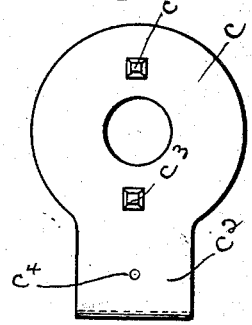
Witnesses
Percy S. Webster.
Stella Anderson.
Inventor
Walter C. Matteson
By Joshua B. Webster
Attorney No. 741,806. Patented October 20, 1903.

UNITED STATES PATENT OFFICE.

WALTER C. MATTESON, OF STOCKTON, CALIFORNIA.

LOCK-WASHER.

SPECIFICATION forming part of Letters Patent No. 741,806, dated October 20, 1903.

Application filed August 4, 1903. Serial No. 168,201. (No model.)

*To all whom it may concern:*

Be it known that I, WALTER C. MATTESON, a citizen of the United States, residing at Stockton, in the county of San Joaquin and State of California, have invented certain new and useful Improvements in Lock-Washers; and I do declare the following to be a full, clear, and exact description of my invention, such as will enable others skilled in the art to which it appertains to make and use the same, reference being had to the accompanying drawings, and to the letters of reference marked thereon, which form a part of this specification.

My invention relates to certain improvements in lock-washers; and the object of my invention is to produce a washer by means of which a nut may be securely locked on a bolt so as not to be shaken off by the jar of heavy machinery or the like.

Another object of my invention is to produce a device for locking-nuts which may be made easily and inexpensively, and thus do away with the complicated and expensive nut-locks now in use. This I accomplish by means of an outside shell, a ratchet-washer inclosed therein, and a ratchet-lever and spring, the outside shell being stationary in respect to the bolt.

The device involves certain novel features of construction, which will be fully described hereinafter.

This specification is an exact description of one example of my invention, while the claims define the actual scope thereof.

Reference is to be had to the accompanying drawings, forming a part of this specification, in which—

Figure 1 is a top plan view of my improved lock-washer before the parts are pressed into position. Fig. 2 is a top plan view of the invention, showing my improved lock-washer as it appears when in use, the bolt being shown in section. Fig. 3 is a bottom plan view of the outside shell, showing spurs thereon.

Similar letters of reference indicate corresponding parts in the several views.

$a$ designates the parts to be held together.

$b$ designates the bolt.

$c$ is a plate of suitable material provided with a round opening through which the threaded part of the bolt may pass.

$c'$ designates triangular points on same, which are bent over so as to form a shell and inclose the ratchet-washer therein.

$c^2$ is a rectangular extension to the plate $c$, which extension is bent over so as to form a slot for the ratchet-lever $f$ to act in.

$c^3$ designates spurs on the bottom of the outside shell $c\ c'\ c^2$, which engage with suitable slots in the parts $a$.

$c^4$ designates circular orifices, which are threaded for the reception of a screw or pin $f'$, which acts as an axle for the ratchet-lever $f$.

$d$ is the ratchet-washer, inclosed in the outside shell $c\ c'\ c^2$. $d'$ designates the teeth thereon.

$d^2$ is an orifice in the center of the ratchet-washer $d$ of suitable shape and size so that the nut may exactly fit therein.

$e$ is the nut, threaded to screw on the threaded part of the bolt, as usual.

$f$ is the ratchet-lever.

$f'$ is the screw or pin on which the ratchet-lever turns.

$f^2$ is a spring embedded on the handle of the ratchet-lever and suitably attached to the side of the shell $c\ c'\ c^2$.

$f^3$ is a circular orifice for the reception of the screw or pin $f'$.

In using my invention the end of the nut $e$ is fitted into the orifice $d^2$ and the bolt is inserted through the circular opening in the shell $c\ c'\ c^2$ and the said nut $e$, carrying with it the shell $c\ c'\ c^2$, with parts attached thereto, and the ratchet-washer $d$ is then screwed upon the threaded portion of the bolt $b$ in the direction indicated by the arrow in the drawings.

The ratchet-washer turns with the nut. The shell $c\ c'\ c^2$ need not turn, but is gradually forced backward until the spurs $c^3$ engage with the suitable slots in the parts $a$. The nut $e$ is then tightened up, and as the ratchet-lever $f$ is held securely engaged with the teeth $d'$ of the ratchet-washer $d$ by means of the spring $f^2$ the nut $e$, securely fitted into the aperture $d^2$ of the washer $d$, cannot be reversed until such ratchet-lever is disengaged from the ratchet-teeth.

When the parts $a$ are of wood, the screw $f'$ may be of a kind suitable for screwing into said wood, and thus aiding in holding the shell $c\ c'\ c^2$ stationary.

What I claim for my lock-washer over the many styles of nut-lock now in use is that the direct effect of the jar of heavy machinery when in operation, which causes an ordinary nut to become loose, in my invention produces the result that when the nut seeks to "climb" down the thread the pressure reacts upon the ratchet-washer, pressing it against the ratchet-lever, thus causing the spurs on the shell to adhere fixedly into position in the slots in the face of the parts being held together. A further advantage is found in the fact that my device may be applied to any ordinary bolt, thus rendering it cheap of construction and easy of adaptation.

It may be here stated that my invention is applicable to many kinds of nuts; but for the sake of convenience and illustration I have described it in connection with a simple hexagon-shaped nut.

Many slight changes may be made in the details of construction of my invention without departing from the spirit thereof or limiting its scope. Hence I do not wish to restrict myself to the precise details of construction herein set forth.

Having fully described my invention, what I do claim as new, and desire to secure by Letters Patent, is—

1. The combination with a bolt, of a stationary shell $c, c', c^2$ provided with spurs $c^3$ and circular orifices $c^4$, a ratchet-washer $d$ inclosed within said shell and provided with ratchet-teeth $d'$ and a suitable orifice $d^2$ adapted to receive the end of the nut $e$, a ratchet-lever $f$ acting on a pin $f'$ and engaging with the ratchet-teeth $d'$, and a spring $f$ adapted to hold the said ratchet-lever in position, all substantially as described.

2. A lock-washer comprising a combination with a bolt of a plate $c$ having angular points $c'$ bent over and forming a shell adapted to inclose the ratchet-washer $d$, said plate also having a rectangular extension $c^2$ bent over and adapted to form a slot for the reception of a ratchet-spring $f$ acting on a pin $f'$, circular orifices $c^4$ in said extension, ratchet-teeth on the ratchet-washer, said washer having a suitable orifice $d^2$, and a nut $e$ adapted to fit into said orifice, all substantially as set forth.

In testimony whereof I have signed my name to this specification in the presence of two subscribing witnesses.

WALTER C. MATTESON.

Witnesses:
PERCY S. WEBSTER,
JOSHUA B. WEBSTER.